United States Patent [19]

Morinaga et al.

[11] Patent Number: 4,888,685
[45] Date of Patent: Dec. 19, 1989

[54] DATA CONFLICT PREVENTION FOR PROCESSOR WITH INPUT/OUTPUT DEVICE

[75] Inventors: Shigeki Morinaga; Mitsuru Watabe, both of Hitachi, Japan

[73] Assignee: Hitachi, Ltd., Tokyo, Japan

[21] Appl. No.: 850,103

[22] Filed: Apr. 10, 1986

[30] Foreign Application Priority Data

Apr. 15, 1985 [JP] Japan ............................ 60-78418

[51] Int. Cl.⁴ .................... G06F 13/38; G06F 13/40
[52] U.S. Cl. ................................ 364/200; 364/240; 364/240.2; 364/240.7; 364/239.9; 364/228.1; 364/247; 364/247.8; 364/232.8
[58] Field of Search ... 364/200 MS File, 900 MS File; 365/203, 204

[56] References Cited

U.S. PATENT DOCUMENTS

| Re. 32,163 | 5/1986 | Tokuda et al. ............. 364/431.11 |
| 4,164,787 | 8/1979 | Aranguren ..................... 364/200 |
| 4,594,661 | 6/1986 | Moore et al. ................... 364/200 |
| 4,672,587 | 6/1987 | Geiger et al. .................. 365/189 |

OTHER PUBLICATIONS

IBM Technical Disclosure Bulletin, Data Buss Precharge, by J. C. Hsieh, vol. 18, No. 6, Nov. 1975.

Primary Examiner—David Y. Eng
Assistant Examiner—Florin R. Munteanu
Attorney, Agent, or Firm—Fay, Sharpe, Beall, Fagan, Minnich & McKee

[57] ABSTRACT

A computer and an input/output device are connected via an interface bus. The input/output device has registers. The computer and the input/output device operate upon the basis of a pair of clock signals. When the input/output device accesses the registers via read and write buses, the buses are precharged during a first period of first clock signal of the pair and controlled by data during a first period of second clock signal of the pair. When the computer accesses the registers via the interface bus, the bus is precharged during the first period of the second clock signal of the pair and controlled by data during the first period of the first clock signal of the pair.

25 Claims, 8 Drawing Sheets

| 31 30 | 27 | 26 | 25 22 | 21 18 | 17 16 | 15 |
|---|---|---|---|---|---|---|
| X | TASK NO. | INPUT/OUTPUT SPECIFYING BIT | COUNTER/TIMER REGISTER NO. | CAPTURE/COMPARE REGISTER NO. | COUNTING OPERATION CONDITION BITS | |

| 14 13 | 12 11 | 8 7 | 4 3 | 0 |
|---|---|---|---|---|
| CAPTURE/COMPARE OPERATION CONDITION BITS | CLOCK INPUT PIN NO. | CAPTURE/RESET SIGNAL INPUT PIN NO. | OUTPUT PIN NO. | |

FIG. 3

DATA CONFLICT PREVENTION FOR PROCESSOR WITH INPUT/OUTPUT DEVICE

FIELD OF THE INVENTION

The present invention relates to a data processor with an input/output device (hereinafter referred to as an I/O device), and more particularly to the control of access to a register addressed by a plurality of elements of the processor.

BACKGROUND OF THE INVENTION

Currently, I/O devices not only do simple functions such as changing data formats, but are also operated under control of a preprogram. Therefore, a register conflict may occur whenever both the I/O device and a central processing unit (hereinafter referred to as a CPU) simultaneously access the same register. For example, when a write operation to a register which may be included in the I/O device is executed under control of the preprogram controlling the I/O device, the CPU of the microcomputer may also access the register to write new data. Then, the content of the register will not be specified by both the I/O devices and the CPU because of the interference between the two write operations to the register.

In a conventional system, for example, as in Japanese Patent Laid-Open Sho 54-58117 disclosure, the operation of the CPU is given a priority over that of the I/O device in accessing a register which is commonly addressable by both the CPU and the I/O device. Namely, when the write operation to the register by both the CPU and the I/O device occurs, the operation by the I/O device will be ineffective. This means that although a register conflict is prevented, the performance of the I/O device is undesirably delayed.

SUMMARY OF THE INVENTION

It is an object of the present invention to provide a new data processor with an I/O device exhibiting improved performance.

It is another object to prevent interference between a CPU and an I/O device during their access of a register addressable by both the CPU and the I/O device.

It is a further object to provide a bus control method for preventing interference during access of a register addressable by both CPU and I/O devices.

In the present invention, prevention of a register conflict is attained by shifting of the operational timing for controlling access by the CPU and the I/O device with the register.

According to the principles of the present invention, the CPU and I/O device operate upon the basis of a pair of clock signals. Each clock signal of the pair has two logical levels and the same frequency, with a difference in phase between each of the clock signals and at least one of the logical levels of the clock signals of the pair being non-overlapping. Access between the CPU and the register is controlled by a first relation of the pair of clock signals while access between the I/O device and register is controlled by a second relation of the pair of clock signals.

BRIEF DESCRIPTION OF THE DRAWINGS

The present invention will be more apparent from the following detailed description of a preferred embodiment taken in conjunction with the accompanying drawings, in which:

FIG. 3 is a schematic diagram showing the format of a task instruction used in the counter/timer unit of FIG. 2;

DETAILED DESCRIPTION

The present invention is available for general devices such as microcomputers having a central processing unit, and I/O devices. Hereinafter, the preferred embodiment of the present invention is explained as being applied to a counter/timer unit such as an I/O device, which is disclosed in U.S. patent application assigned Ser. No. 793,350/85 entitled "Programmable Counter/Timer Device".

Figure 1:
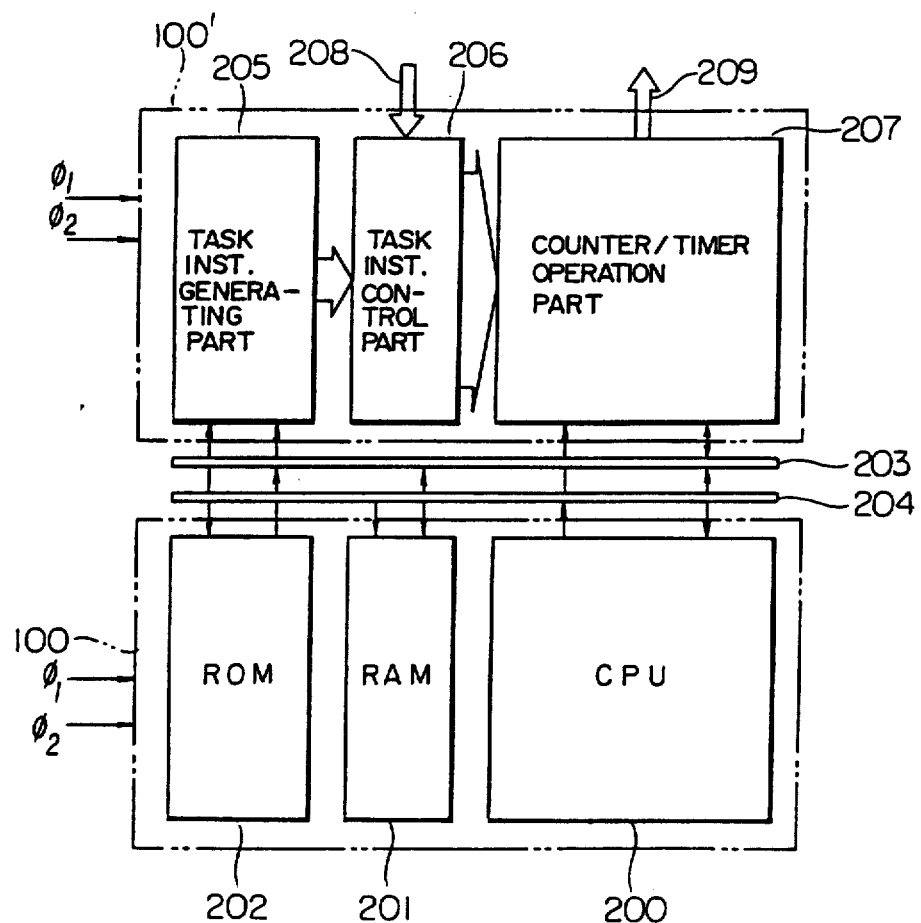
FIG. 1 is a block diagram showing an embodiment of a single-chip microcomputer, to which the present invention is applied.

FIG. 1 shows the outline of an example of a single-chip microcomputer, to which the present invention is applied. Referring to FIG. 1, a microcomputer unit 100 is made up of a CPU (namely, a central processing unit) 200, a RAM 201 serving as a data storage part, and a ROM 202 serving as a program storage part. Further, a counter/timer unit 100' is made up of a task instruction generating part 205, a task instruction control part 206 and a counter/timer operation part 207. The microcomputer unit 100 is connected to the counter/timer unit 100' through a data bus 203 and an address/control bus 204.

The task instruction generating part 205 is formed mainly of a register group which stores task instructions for specifying registers and input/output terminals used in each task and for specifying the operation mode of each of the specified registers. In FIG. 1, the task instructions are sent from the microcomputer unit 100 to the task instruction generating part 205 through the data bus 203, to be stored in the register group. However, in a case where tasks to be carried out in the counter/timer unit 100' have been previously determined, task instructions for carrying out the above tasks may be stored in advance in a ROM (namely, a read only memory), as needed. Further, this ROM may be a ROM whose contents can be altered, such as an erasable and programmable ROM or an electrically erasable and programmable ROM. The task instructions written in the task instruction generating part 205 are successively read out in a predetermined order, and sent to the counter/timer operation part 207 through the task instruction control part 206, to control the part 207. Thus, all of the task instructions are executed in the predetermined order. Incidentally, in FIG., 1, reference numeral 208 designates an input terminal group for supplying a control signal from the outside to the task instruction control part 206, and output terminal groups 209 for delivering an output signal which corresponds to the result of arithmetic/logic operations performed in the counter/timer operation part 207, to the outside and the microcomputer unit 100.

The microcomputer unit 100 and the counter/timer unit 100' each receive a pair of clock signals $\phi_1$ and $\phi_2$ for basic clock pulse operation. Each clock signal of both pairs of the clock signals has two logical levels and the same frequency with a difference in phase between each of the clock signals in each of the pairs. Further, at least one of the logical levels of both of the clock signals in each of the pairs is non-overlapping. With respect to the currently disclosed embodiment, by non-overlapping, it is meant the first and second clock signals are never both in the logical ONE state at the same time. Other embodiments may be constructed with the first and second clock signals never both being in the ZERO logical state at the same time.

Each pair of clock signals may be provided from one clock source or from different sources which are synchronized.

In the embodiment discussed, each pair of clock signals is considered as being identical in order to simplify the description.

The task instruction control part 206 generates a decoded signal for controlling the operating order and operation modes of constituent elements of the counter/timer operation part 207 in synchronism with clock signals $\phi_1$, $\phi_2$, on the basis of a task instruction from the task instruction generating part 205 and a control signal from the input terminal group 208.

The counter/timer operation part 207 performs various operations such as mentioned below. That is, in the part 207, a counter/timer register is incremented to perform a counter/timer function, the contents of a counter/timer register are transferred to a capture register, the contents of a counter/timer register are compared with the contents of a compare register, an output signal is delivered to the output terminal group 209, and so on.

Figure 2:
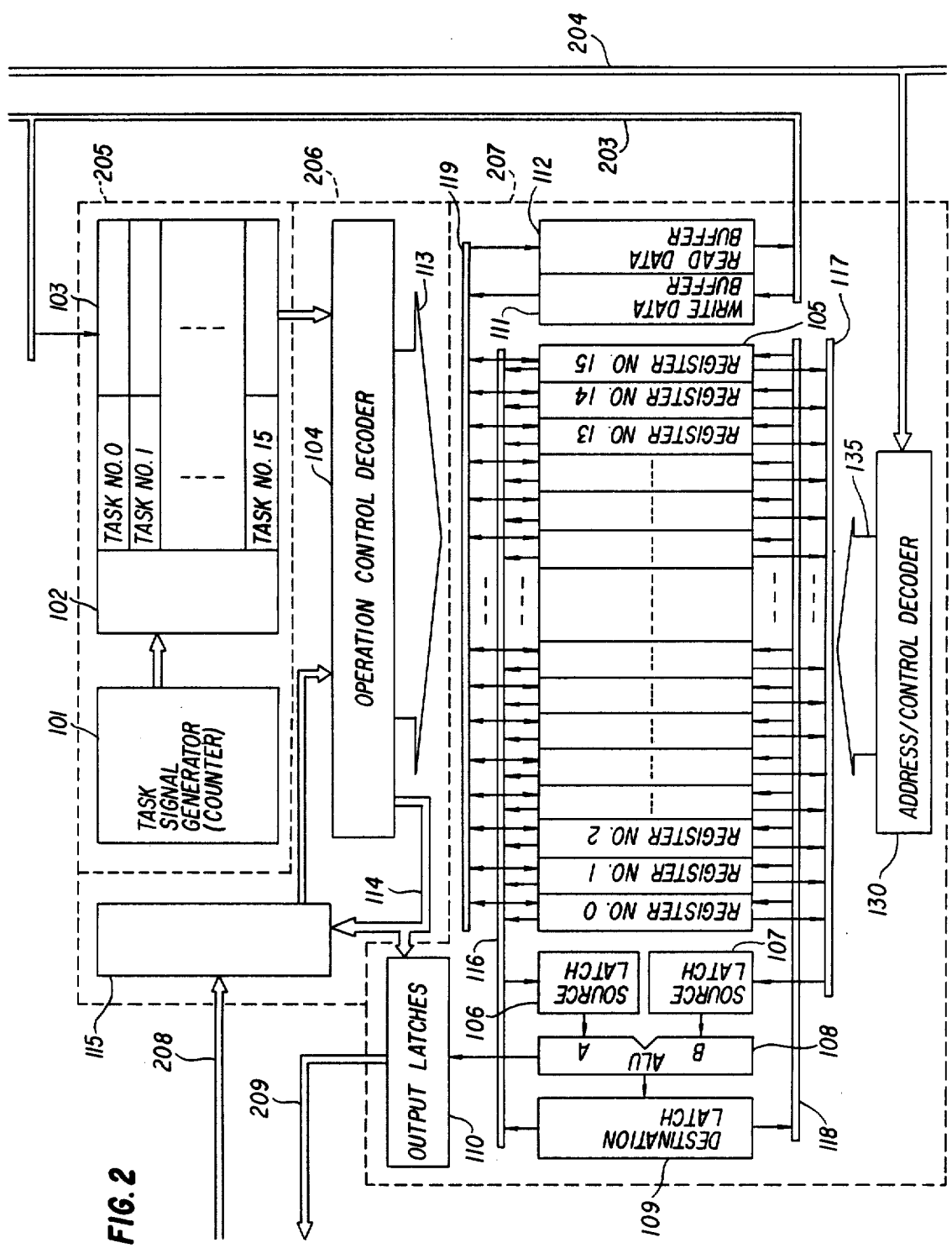
FIG. 2 is a block diagram showing a counter/timer unit as an embodiment applied to the present invention, included in the single-chip microcomputer of FIG. 1.

FIG. 2 shows, in block, the detailed construction of the counter/timer unit 100'. Referring to FIG. 2, the task instruction generating part 205 includes a task signal generating circuit 101 which is formed of a counter in the present embodiment, a task address decoder 102, and a task register group 103 which is made up of sixteen task registers in the present embodiment. In order to control various apparatus connected externally to the single-chip microcomputer, it is necessary to carry out a large number of input/output processing tasks.

While, according to the present embodiment, a number of task instructions are stored in the task register group 103, and task numbers are successively generated by the task signal generating circuit 101. The task numbers are supplied to the task register group 103 through the task address decoder 102, to read out a task instruction from a task register corresponding to a task number specified by the task signal generating circuit 101 and to execute the read-out task instruction.

In the present embodiment, each task instruction, as shown in FIG. 3, is formed of 31 bits and includes a task number of 4 bits, an input or output specifying bit of one bit, a counter/timer register number of 4 bits, a capture/compare register number of 4 bits, conditions in counting operation given by 3 bits, conditions in capture/compare operation given by 3 bits, a clock input pin number of 4 bits, a capture/reset signal input pin number of 4 bits, and an output pin number of 4 bits. The task instruction read out from the task register is applied to an operation control decoder 104, to generate a control signal 113 for the counter/timer operation part 207 and an input/output pin control signal 114. An input pin number control circuit 115 is used for controlling the application of signals from the input terminal group 208 to the operation control decoder 104.

The counter/timer operation part 207 includes a register group 105 which, in the present embodiment, is formed of 16 registers each capable of being specified as a desired one of a counter/timer register, a capture register and a compare register, the first source latch 106, the second source latch 107, an arithmetic unit (ALU) 108 for performing arithmetic/logical operations (such as incrementing operation, shift operation, etc.) in counter/timer processing, a destination latch 109 for supplying the result of the arithmetic/logic operation performed by the ALU 108 to buses 116 and 118, an output latch group 110 for delivering an output from the ALU 108 to the output terminal group 209, a write data buffer 111 for receiving data from the microcomputer unit 100 through the data bus 203 to write the data in the register group 105, and a read data buffer 112 for supplying data to the data bus 203.

Reference numeral 130 designates the address/control decoder which is connected to the address/control bus 204 and provides an address/control signal 135 in order to specify a register in register group 105 and the contents of an access operation to the register by the CPU 200.

When a task instruction is read out from a task register of the task register group 103, a register which is included in the register group 105 and specified by the task instruction, is accessed at an appropriate time by the action of the operation control decoder 104, to carry out a counter/timer operation and input/output processing. The ALU 108 performs operations such as the increment of an input thereto and the comparison between two inputs. The decoding operation may be unnecessary in the task instruction control part 206, if for example a task instruction is so designed that each bit of the task instruction corresponds to each of the operations of the counter/timer operation part 207.

The register group 105, the first source latch 106, the second source latch 107, the destination latch 109, the write data buffer 111 and the read data buffer 112 are connected to one another through at least one of the first and second read buses 116 and 117 each for inputting read data, a write bus 118 for outputting write data, and an interface bus 119 for receiving data from and supplying data to the data bus 203 of the microcomputer.

The output latch group 110 is used for holding the result of comparisons obtained when a comparing operation is performed. An output from the output latch group 110 is given to the output terminal group 209. Which of the output latches included in the latch group 110 is applied with the result of comparisons from the ALU 108, is determined by the input/output pin control signal 114 from the operation control decoder 104.

Figure 4:
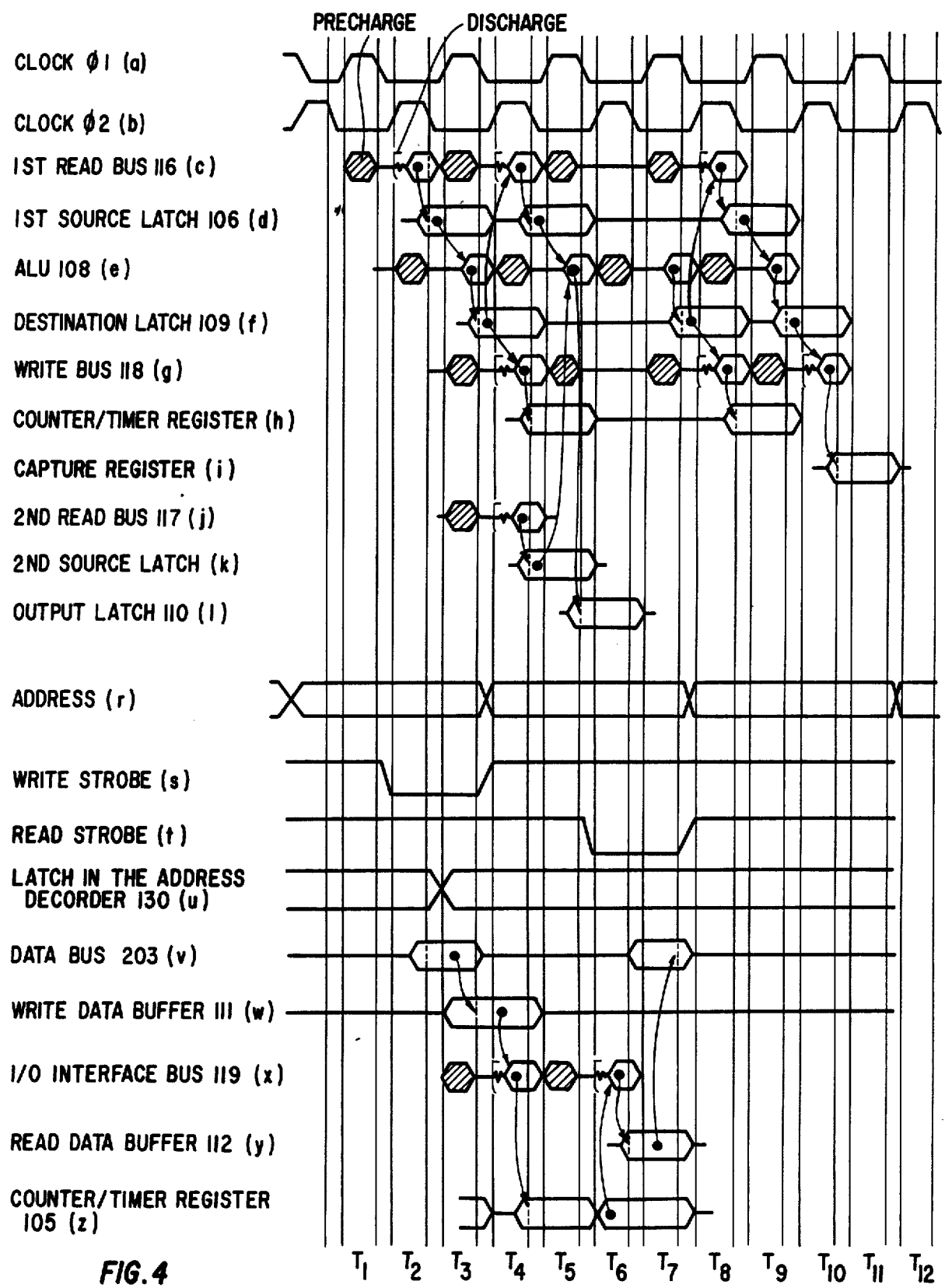
FIG. 4 is a timing chart showing the timing of operations in the counter/timer unit of FIG. 2 and showing the timing of an access operation to a register of the counter/timer unit by a micro-computer.

FIG. 4 is a timing chart showing a data flow in the counter/timer operation part 207. The counter/timer operation part 207 is operated by a first clock signal $\phi_1$ and a second clock signal $\phi_2$ which are shown in waveforms (a) and (b) of FIG. 4, respectively and are 180 degrees out of phase with each other to form a two-phase clock signal. Further, the non-overlapping first and second clock signals $\phi_1$ and $\phi_2$ are also used as an internal clock signal of the microcomputer unit 100. Now, explanation will be made by way of an example where, on the basis of a task instruction, a counter/timer register is incremented and then the contents of the counter/timer register of register group 105 are compared with the contents of a compare register in register group 105. Waveform (c) of FIG. 4 shows the state of the first read bus 116. In a period $T_1$ when the first clock signal $\phi_1$ takes a level "1", the first read bus 116 is precharged. In a period $T_2$ when the second clock signal $\phi_2$ takes the level "1", the contents of a register which is included in the register group 105 and which has been specified as a counter/timer register by the task instruction, are fetched to the first read bus 116, and hence the bus 116 begins to discharge in accordance with the fetched contents. Thus, the contents of the above register (namely, the counter/timer register) appear on the bus 116 as shown by the round black mark. The data on the bus 116 is latched by the first source latch 106 in the period $T_2$ when the second clock signal $\phi_2$ takes the level "1". Waveform (d) of FIG. 4 shows the state of the first source latch 106. As shown in waveform (d) of FIG. 4 by the dotted line, the data on bus 116 is latched by first source latch 106 at the falling edge of the second clock signal $\phi_2$ in the period $T_2$. As used herein, the round black mark indicates that the data is established and the dotted line shows that the data is latched. The data latched by the first source latch 106 is applied to an A-terminal of ALU 108 which has been precharged during period $T_2$ when the second clock signal $\phi_2$ takes the level "1". While data applied to a B-terminal of ALU 108 is set to zero, since the task instruction has specified a mode in which the counter/timer register is incremented, an input to the B-terminal is not required. The ALU 108 performs an operation necessary for incrementing the counter/timer register, in accordance with a control signal from the operation control decoder 104. In other words, the ALU 108 increments the contents of the counter/timer register which are applied to the A-terminal, by one. The incremented data from the ALU 108 is applied to the destination latch 109, to be latched in a period $T_3$ when the first clock signal $\phi_1$ takes the level "1". Waveform (f) of FIG. 4 shows the state of the destination latch 109. Next, the output of the destination latch 109 is applied to the write bus 118 and first read bus 116 which have been precharged in the period $T_3$ when the first clock signal $\phi_1$ takes the level "1". The state of the bus 118 and the state of the bus 116 are shown in waveforms (g) and (c) of FIG. 4, respectively. In more detail, the first read bus 116 and the write bus 118 discharge in accordance with the contents of the destination latch 109, in a period $T_4$ when the second clock signal $\phi_2$ takes the level "1". Thus, data held by the destination latch 109 appears on the buses 116 and 118. The data on the first read bus 116 is written in the first source latch 106. The data on the write bus 118 is returned to the register which is included in the register group 105 and specified as the counter/timer register by the task instruction, as shown in waveform (h) of FIG. 4. In other words, the incremented data from the destination latch 109 is written in the first source latch 106 to prepare for the subsequent comparing operation, and is written in the register which is specified as the counter/timer register, to cause this register to act as a counter.

Reference data previously stored in a register which is included in the register group 105 and specified as a compare register, is written in the second source latch 107 through the second read bus 117. The write-in operation will be explained below, with reference to waveforms (j) and (k) of FIG. 4. Referring to waveform (j) of FIG. 4, the second read bus 117 is precharged in the period $T_3$ when the first clock signal $\phi_1$ takes logical level "1", and discharges in accordance with the reference data held by the compare register, in the period $T_4$ when the second clock signal $\phi_2$ takes the level "1". Thus, the reference data of the compare register appears on the second read bus 117. The reference data on bus 117 is written in the second source latch 107 in the period $T_4$ when the second clock signal $\phi_2$ takes the level "1", as shown in waveform (k) of FIG. 4.

The output of the first source latch 106 and the output of the second source latch 107 are applied to the A-terminal and B-terminal of the ALU 108, respectively. A comparing operation at ALU 108 is completed during a period $T_5$ when the first clock signal $\phi_1$ takes the level "1", and the result of the comparison is held by a latch which is included in output latch group 110 and specified by input/output pin control signal 114, as shown in waveform (l) of FIG. 4. It is to be noted that the precharge and discharge actions of each of the buses 116, 117 and 118 are controlled by control signals from operation control decoder 104 in response to clock signals $\phi_1$, $\phi_2$.

As explained next, data held by a counter/timer register is transferred to a capture register, on the basis of a task instruction. Data held by a counter/timer register which is specified by a task instruction, is fetched into the first source latch 106, in the same manner as mentioned above. In order to transfer the data held by the counter/timer register to a capture register, it is necessary to send the data to the destination latch 109 as it is, and to write the output data of the destination latch 109 in a register which is included in register group 105 and specified as a capture register by the task instruction, through write bus 118 as well as to return the counter/timer register as shown in waveform (h) of period $T_4$.

Referring to waveform (c) of FIG. 4, the first read bus 116 discharges in accordance with the output of destination latch 109 in a period $T_8$ when the second clock signal $\phi_2$ takes level "1", to obtain the output of destination latch 109 on the first read bus 116. The data on bus 116 is written in the first source latch 106 as shown in waveform (d) of FIG. 4. The data written in latch 106 is applied to the A-terminal of the ALU 108, and ALU 108 writes the same data as applied to the A-terminal, in destination latch 109 in a period $T_9$ when the first clock signal $\phi_1$ takes the level "1". The write bus 118 which has been precharged in the period $T_9$, discharges in accordance with the data of the destination latch 109 in a period $T_{10}$ when the second clock signal $\phi_2$ takes the level "1", to obtain the data of the destination latch 109 on the write bus 118 as shown in waveform (g) of FIG. 4. The data on the write bus 118 is written in the register which is included in the register group 105 and specified as a capture register by the task instruction, as shown in waveform (i) of FIG. 4.

Control signals for controlling constituent elements of the counter/timer operation part 207 in a predetermined order and in predetermined periods as mentioned above, are delivered from the operation control decoder 104 in accordance with a task instruction.

Referring again to FIG. 4, next explanation will be made of how CPU 200 accesses the register which is included in the register unit 105 in order to write and read data. In the operation of the CPU 200, it is now assumed that a period of time between the point that the first clock signal $\phi_1$, first attains a level "0", and the point that the first clock signal $\phi_1$ next attains a level "0" constitutes one machine cycle.

Waveform (r) of FIG. 4 shows the address/control signal of two machine cycles in length, during which data is transferred between microcomputer 100 and buffer register 111.

Waveforms (s) and (t) of FIG. 4 show the write and read strobe signals of one machine cycle in length, during which a period of logical level "0" enables of write and read operations.

For purposes of simplifying this explanation, in FIG. 4, waveforms (r), (s) and (t) are drawn as approximations of the actual timing.

Waveform (u) of FIG. 4 shows the address/control data which is held in a latch (not shown) included in the address/control decoder 130 and the threshold logic level of that data is established (e.g., latched) during a period at the end of a machine cycle (as shown for example in period $T_3$ in FIG. 4).

Data is written in a register included in register group 105 from microcomputer unit 100 as follows.

As shown in waveform (r) of FIG. 4, microcomputer 100 generates an address signal for the register in register group 105 into which data is to be written, at the beginning of a "0" logical level of first clock signal $\phi_1$, during a period before period $T_1$. As shown in waveforms (r) and (w) of FIG. 4, the data is transferred on data bus 203 and held in write data buffer 111 during period $T_3$. Interface bus 119 is precharged during period $T_3$ when the first clock signal $\phi_1$, attains a "1" logical level and discharged in period $T_4$ when the second clock signal $\phi_2$ takes a "1" logical level, in accordance with the contents of the write data buffer 111 as shown in waveform (x) of FIG. 4. Data on interface bus 119 is written in a register of register group 105 corresponding to the address held in the latch of address/control decoder 130, during period $T_4$ as shown in waveform (z) of FIG. 4.

Data held in a register included in register group 105 is read by the microcomputer as follows. As shown in waveform (r) of FIG. 4, the microcomputer 100 generates an address signal for the register, from which data is read, when the first clock signal $\phi_1$ attains a "0" logical level during the period $T_4$. Interface bus 119 is precharged during the period $T_5$ when the first clock signal $\phi_1$, attains a "1" logical level and discharged in the period $T_6$ when the second clock signal $\phi_2$ attains a "1" logical level in accordance with the contents of the designated register in register group 105 as shown in waveforms (x) and (z) of FIG. 4. The address of the corresponding register in register group 105 is directly given by address decoder 130 without latching of the address by address/control decoder 130. The data on the interface bus is transferred to data bus 203 through read data buffer 112 during periods $T_6$ and $T_7$ as shown in waveforms (x), (y) and (v) of FIG. 4.

Now, as was previously described, the operation of I/O device 100' explained in reference to waveforms (c)–(l) of FIG. 4 and the operation of the CPU 200 of microcomputer 100 explained in reference to waveforms (r)–(z), are executed independently. Therefore, if the addressed register included in register group 105, designated in waveform (h) and in waveform (z) during period $T_4$ happens to be the same, the contents of the register are not specified because both the I/O device and the CPU access the same register at the same time, thereby causing an interference between CPU 200 and unit 100. This causes a malfunction of the data processor. A specific example is explained later.

Figures 5, 6:
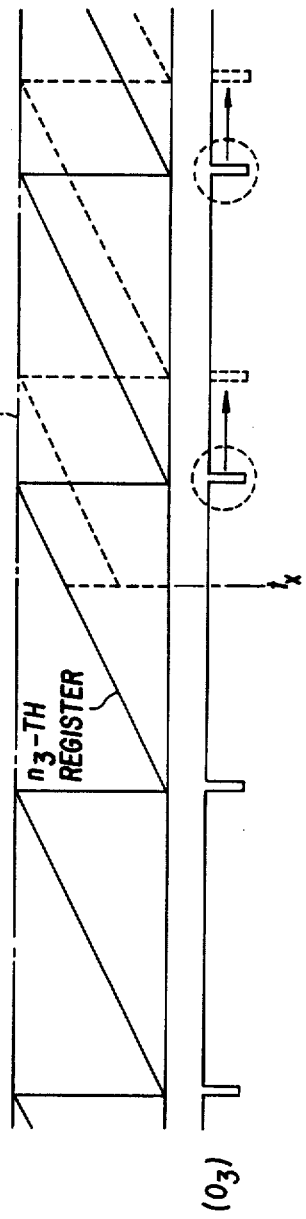
FIG. 5 is a schematic diagram showing the format of a task instruction for specifying a processing example.
FIG. 6 is a waveform chart for explaining the execution of the task instruction given by the format of FIG. 5 and the problem of the register conflict.

FIG. 5 shows as an example, a task instruction for generating a constant interval. Referring to FIG. 5, the task instruction is stored in the $k_3$-th task register of the task register group 103, and specifies output processing since the 26th bit has a value "1". The $n_3$-th register and the $m_3$-th register of the register group 105 are used as a counter/timer register and a compare register, respectively.

The counter/timer register performs a counting operation for an internal clock signal, since the clock specifying bit (namely, the 17th bit) has a value "0". Data in the counter/timer register is compared with data in the compare register. When the data in the counter/timer register coincides with or becomes greater than the data in the compare register, a logical value "0" is delivered to the $o_3$-th pin and the counter/timer register is reset, since the logical value specifying bit (namely, the 12th bit) has a value "0" and the post-coincidence control bit (namely, the 13th bit) has a value "1".

FIG. 6 shows the operation of the counter/timer operation part based upon the task instruction of FIG. 5 by a solid line. Referring to FIG. 6, when the contents of the $n_3$-th register (namely, the counter/timer register) coincide with the contents of the $M_3$-th register (namely, the compare register), an output pulse ($o_3$) is delivered to the $o_3$-th pin and the $n_3$-th register is reset.

The following operation of counter/timer 207 shown in FIG. 6 corresponds to the explanation with waveforms (c)–(l) shown in FIG. 4. As shown in the waveforms (k) and (z) of period $T_4$ of FIG. 4, when access to the same $n_3$-th register of the register group 105 is attempted by the both CPU 200 and by counter-timer 207, the content of the $n_3$-th register is not specified by either CPU 200 or counter/timer 207 because of the interference between them. Then, the comparing operation by the ALU 108 as shown in waveform (e) during period $T_5$ of FIG. 4 will not be correct. Of course, the output of LATCH 110 as shown in waveform (l) during period $T_5$ of FIG. 4 also will not be correct.

The time $t_x$ in FIG. 6 shows the above status as example. Namely, on the time $t_x$, the register conflict occurs. Then the content of the $n_3$-th register of register group 105 of the counter/timer 207 may go to the value shown at the mark "x". Operations after time $t_x$ may follow the dotted line as shown in FIG. 6. Then, output $O_3$ indicated by the surrounding dashed lines may be delayed, as shown by the arrow. This is an example of a malfunction which has long plagued currently available data processors.

Next explanation will be made with reference to FIG. 7, of how the CPU 200 accesses a register included in register group 105 in order to write and read data according to the present invention.

Figure 7:
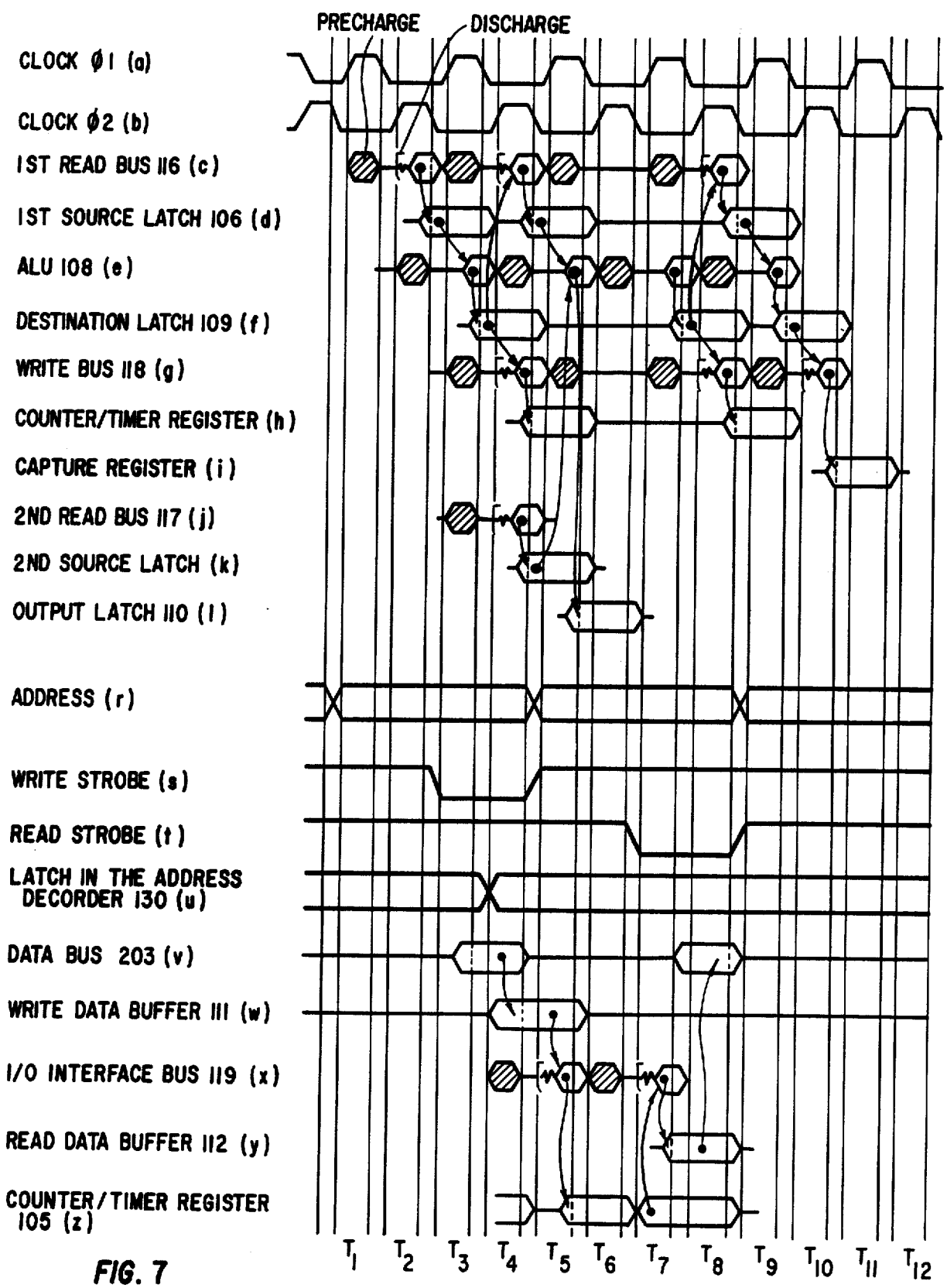
FIG. 7 is a timing chart corresponding to FIG. 4 and resolving the register conflict according to the present invention.

In the present invention, as is easily shown by comparing FIGS. 4 and 7, the two clock signals $\phi_1$, $\phi_2$ are used for interface bus 119 in a different relation than in the prior art.

In the operation of the CPU 200, it is now assumed that the period of time between the point when the first clock signal $\phi_1$ attains a "0" logical level and the point when the first clock signal $\phi_1$ next attains a "0" logical level constitutes one machine cycle. Waveform (r) of FIG. 7 shows the address/control signal of two machine cycles in length, during which data is transferred.

Waveforms (s) and (t) of FIG. 7 show the write and read strobe signals of one machine cycle in length, during which a period of "0" logical level enables write and read operations. In the Figure, the waveforms (r), (s) and (t) are drawn as approximations of the actual timing.

Waveform (u) of FIG. 7 shows the address/control data which is held in a latch (not shown) included in the address/control decoder 130 and the threshold logic level of that data is established at a period towards the end of a machine cycle (as shown, for example, in period $T_4$ in FIG. 7).

Data is written in a register included in register group 105 from microcomputer unit 100 as follows.

As shown in waveform (r) of FIG. 7, microcomputer 100 generates an address signal for the register of register group 105 into which the data is to be written at the point where the second clock signal $\phi_2$ attains a "0" logical level during the period $T_1$. As shown in waveforms (v) and (w) of FIG. 7, the threshold logic level of that data is established on data bus 203 and held in write data buffer 111 during the period $T_4$. The interface bus 119 is precharged during period $T_4$ when the second clock signal $\phi_2$ attains a "1" logical level and discharged in period $T_5$ when the first clock signal $\phi_1$ attains a "1" logical level in accordance with the contents of the write data buffer 111, as is shown in waveform (x) of FIG. 7. The data on interface bus 119 is written in the register, the address of which is held in the latch of the address/control decoder 130, in the period $T_5$ as shown in waveform (z) of FIG. 7.

Data held in a register which is included in register group 105 is read by the microcomputer as follows. As shown in waveform (r) of FIG. 7, the microcomputer 100 generates an address signal for the register, from which data is read, when the second clock signal $\phi_2$ attains a "0" logical level during the period $T_5$. Interface bus 119 is precharged during period $T_6$ when the second clock signal $\phi_2$ attains a "1" logical level and discharged in the period $T_7$ when the first clock signal $\phi_1$ attains a "1" logical level in accordance with the contents of the designated register in register group 105 as shown in waveforms (x) and (z) of FIG. 7. The address of the corresponding register in register group 105 is directly given by address decoder 130 without latching of the address by address/control decoder 130. The data on the interface bus 119 are transferred to the data bus 203 through the read data buffer 112 during periods $T_7$ and $T_8$ as shown in waveforms (x), (y) and (v) of FIG. 7.

Now, in the present invention, the register conflict is prevented even through the operation of I/O device 100' as explained by reference to waveforms (c)–(l) of FIG. 4 and the operation of the CPU 200 of microcomputer 100 as explained by reference to waveforms (r)–(z), occur independently. Even if the same register included in register group 105 is designated in waveform (h) and in waveform (z) during period $T_4$, the contents of the designated register are always specified.

Although both the I/O device and the CPU access the same register, the timing is different. Therefore, an interference between both of them is prevented. In FIG. 7, the contents of a register included in register group 105 and designated by both I/O device 100' and by CPU 200 are the contents, which appear on write bus 118 during the period $T_4$, and are the contents which appear on interface bus 119 during period $T_5$, after the period $T_4$. Then, the operation explained by reference to waveforms (c)–(l) of FIG. 7 are executed based on the contents of the same register read during period $T_5$ in the next period. This is a normal operation in a data processor.

Figure 8:
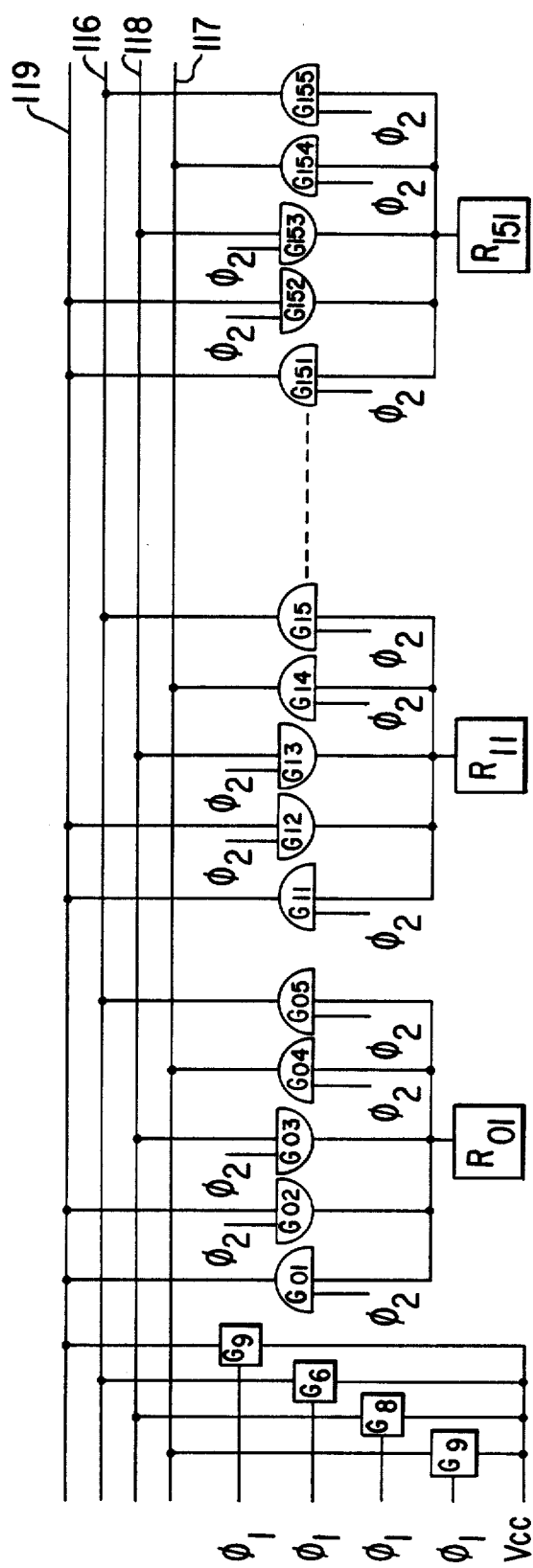
FIG. 8 shows concepts of connections between buses and register elements according to the prior art.
Figure 9:
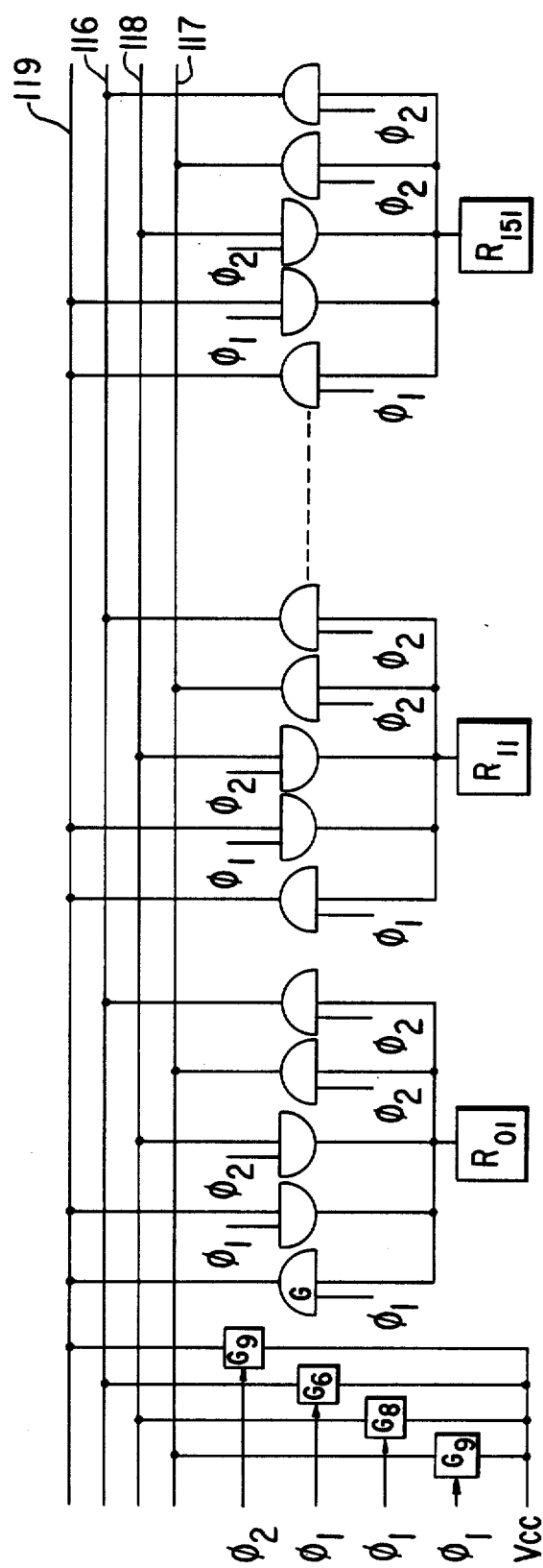
FIG. 9 shows concepts of connections between buses and register elements according to the present invention.

FIGS. 8 and 9 show the relation between buses 116, 117, 118 and 119 and registers $R_{01}$, $R_{11}$–$R_{151}$, each of which is an element of the register included in register unit 105. Of course, many conventional elements are omitted from the figures in order to simplify the explanation. In the figures, the reference letter Gs with reference subscripts designate gates switched on and off when predetermined conditions (e.g., address signal, control signal, write and read strobe signals, etc.) are satisfied and not satisfied, respectively. Vcc designates a power source to charge the buses. In both FIGS. 8 and 9, in order to simplify explanation, the condition of the gate control signal is shown only with the clock signals $\phi_1$ and $\phi_2$. As shown in FIGS. 4 and 8, in the prior art, precharging of all buses 116–119 is controlled by the first clock signal $\phi_1$ added to the gates $G_6$–$G_9$ and data is written on or read from all register elements $R_{01}$, $R_{11}$–$R_{151}$ by the second clock signal $\phi_2$ added to the gates $G_1$, $G_{11}$–$G_{151}$.

Contrarily, as shown in FIGS. 7, and 9, in the embodiment of the present invention, precharging of interface bus 119 is controlled by the second clock signal $\phi_2$ and two gates $G_{01}$, $G_{02}$, $G_{11}$, $G_{12}$–$G_{151}$, $G_{152}$ of each element of the register related to the interface bus 119 are controlled by the first clock signal $\phi_1$. The other things are the same as shown in FIGS. 4 and 8.

We claim:

1. A bus control method for a data processor having an input/output device, comprising the steps of:
   providing said data processor with a microcomputer unit including a central processing unit, RAM for storing data and ROM for program storage; and connecting said microcomputer to said input/output device with a data bus and an address bus;
   precharging a first bus included within said input/output device and used to provide access between an arithmetic logic unit and an internal register included within said input/output device, during a predetermined period of a first clock signal that is less than the cycle of the first clock signal;
   controlling said first bus during a predetermined period of a second clock signal that is less than the cycle of the second clock signal, according to data to be written in or read from said internal register;
   maintaining a relation between said predetermined periods whereby said predetermined periods do not overlap;
   precharging a second bus included within said input/output device and used to provide access between said register and said central processing unit of said microcomputer during said predetermined period of said second clock signal; and
   controlling said second bus during said predetermined period of said first clock signal according to data to be written in or read from said internal register.

2. A bus control method in accordance with claim 1, further comprising the steps of:
defining said predetermined period of said first clock signal as the occurrence of a first logical state in said first clock signal.

3. A bus control method in accordance with claim 2, further comprising the steps of:
defining said predetermined period of said second clock signal as the occurrence of said first logical state in said second clock signal.

4. A bus control method in accordance with claim 1, further comprising the steps of:
defining said predetermined period of said second clock signal as the occurrence of a first logical state in said second clock signal.

5. A bus control method in accordance with claim 4, further comprising the steps of:
defining said predetermined period of said first clock signal as the occurrence of said first logical state in said first clock signal.

6. A data processor, comprising:
programmable means for processing data and receiving and operating upon a first clock signal;
input/output means including an arithmetic logic unit and internal register files, for processing data and receiving and operating upon a second clock signal;
third means for storing data;
fourth means including a plurality of elements for transferring data, a first one of said elements extending between said internal register files of said input/output means and said arithmetic logic unit and a second one of said elements extending between said internal register files and said programmable means;
said clock signals having logical levels and being of the same frequency with a difference in phase with respect to one another such that a first of said logical levels of each said clock signals is non-overlapping;
fifth means for precharging said first one of said elements during certain periods of one of said clock signals and for precharging said second one of said elements during certain periods of the other of said clock signals.

7. A data processor in accordance with claim 6, wherein said fifth means comprises:
means for controlling said second of said elements during a first predetermined period of said one of said clock signals according to data transferred via said second of said elements between said programmable means and said internal register files, and for controlling said one of said elements during a first predetermined period of said other of said clock signals according to data transferred via a said one of said elements between said arithmetic logic unit and internal register files.

8. A data processor in accordance with claim 6, wherein said fifth means comprises:
means for precharging said one of said elements during a first one of said logical levels of a first one of said clock signals and for controlling said one of said elements during a first one of said logical levels of a second one of said clock signals according to data transferred via said one of said elements.

9. A data processor in accordance with claim 8, wherein said fifth means comprises:
means for precharging said second of said elements during a first one of said logical levels of said second one of said clock signals and for controlling said second of said elements during said first predetermined period logical level of said first one of said clock signals according to data transferred via said second of said elements.

10. A data processor in accordance with claim 6, wherein said fifth means comprises:
means for precharging said second of said elements during a first one of said logical levels of a second one of said clock signals and for controlling said second of said elements during a first one of said logical levels of a first one of said clock signals according to data transferred via said second of said elements.

11. A data access conflict preventing method for a data processor with an input/output device, comprising the steps of:
providing said data processor with a microcomputer including a central processing unit, a RAM for data storage and a ROM for program storage and connecting said microcomputer to said input/output device with a data bus and an address/control bus;
generating timing clock signals including first and second clock signals having a plurality of logical states and the same frequency with a difference in phase between their logical states, wherein a certain logical state of the first and second clock signals is non-overlapping;
precharging a second data bus extending between an arithmetic logic unit and a register during a first period while the first clock signal is in the certain logical state;
precharging a third data bus extending between the data register and said central processing unit of said microcomputer during a second period while the second clock signal is in the certain logical state;
causing data transmission via the third data bus during the first period; and
causing data transmission via the second bus during the second period.

12. A data access conflict prevention system for a data processor including an input/output device, comprising:
a microcomputer unit including a central processing unit, RAM for data storage and ROM for program storage;
a data register;
a data bus and an address/control bus connected between said microcomputer unit and said input/output device;
a second data bus for transmitting data between an input/output device and the data register;
a third data bus for transmitting data between said central processing unit and the data register;
means connected to said second and third data buses for alternately precharging the second and third data buses; and
means connected to said second and third data buses for alternately causing data transmission via the second and third data buses with precharging and data transmission being alternately performed on each of said second and third buses wherein the data processor accesses the data register independently of the input/output device accessing the data register.

13. The system of claim 12, wherein the data register and the input/output device are incorporated into a single monolithic device.

14. The system of claim 13, wherein the precharging means alternately provides electric potentials to the second and third data buses.

15. The system of claim 12, wherein said input/output device, data register, and second and third data buses are incorporated into a monolithic structure, further comprising:
buffer means connected to said third data bus and connected to the data processor, for enabling transmission of data between the data processor and said data register via the third data bus.

16. A data processor having an input/output device, comprising:
an input/output device including an arithmetic logic unit, internal register files and a plurality of data buses separately coupled to said internal register files, said device operating on the basis of clock signals having the same frequency with a difference in phase between them and a first logic level of each of said clock signals being non-overlapping, means to precharge a selected one of said data buses during said first logic level of one of said clock signals and to discharge said selected one of said data buses during said first logic level of one other of said clock signals according to data being transferred via said selected one of said data buses, means to precharge selected others of said data buses during said first logic level of said other one of said clock signals and to discharge said selected others of said data buses during said first logic level of said one of said clock signals according to data being transferred via said selected others of said data buses, and to enable said arithmetic logic unit to write to said internal register files via one or more of said others of said data buses; and
a central processing unit receiving and operating upon said plurality of clock signals independently of said arithmetic logic unit, to write to said internal register files via said one of said data buses.

17. The processor of claim 16, wherein said arithmetic logic unit, internal register files and data buses are incorporated into a monolithic device.

18. The data processor of claim 16, wherein said arithmetic logic unit, internal register files and data buses are incorporated into a monolithic device, said monolithic device further comprising:
a peripheral data bus connected to said central processing unit;
an address bus connected to said central processing unit;
buffer means coupled between said peripheral data bus and said one of said data buses, for transmitting data between said central processing unit and said register files; and
control means coupled between said register files and said address bus, for addressing said register files according to addresses transmitted via said address bus.

19. The data processor of claim 18, further comprising a randomly addressable memory accessible by both said input/output device and said central processing unit via said peripheral data bus and address bus.

20. A data processor including an integrated input/output device, comprising:
memory means for storing data;
a plurality of data buses coupled to said memory means;
processing means operating on the basis of clock signals having logic levels and being of the same frequency with a difference in phase between them so that a first logic level of each of said clock signals is non-overlapping, for reading data from and writing data in said memory means via one of said data buses;
logic means operating independently of said processing means on the basis of said clock signals for reading data from and writing data in said memory means via others of said data buses;
means for precharging said one of said data buses during said first logic level of a first of said clock signals and for precharging said others of said data buses during said first logic level of a second of said clock signals; and
means for accessing said memory means via said one of said data buses during said first logic level of said second clock signal and for accessing said memory means via said others of said data buses during said first logic level of said first clock signal.

21. The data processor of claim 20, wherein said memory means, data buses and logic means are integrated into a monolithic device.

22. The data processor of claim 20, wherein said memory means, data buses and logic means are integrated into a monolithic device, said monolithic device further comprising:
a peripheral data bus connected to said central processing unit;
an address bus connected to said central processing unit;
buffer means coupled between said peripheral data bus and said register files, for transmitting data between said central processing unit and said register files; and
control means coupled between said register files and said address bus, for addressing said register files according to addresses transmitted via said address bus.

23. The data processor of claim 22, further comprising a randomly addressable memory accessible by both said input/output device and said central processing unit via said peripheral data bus and address bus.

24. The data processor of claim 22, wherein:
said accessing means comprises a first stage of the monolithic device connected to said peripheral data bus, and a second stage of the monolithic device;
said one of said data buses is connected between said first stage and said memory means to enable transmission of data between said processing means and said memory means via said peripheral data bus and said first stage; and
said others of said data buses are connected between said second stage and said memory means to enable transmission of data between said logic means and said memory means via said second stage.

25. The data processor of claim 20, wherein:
said memory means, data buses and logic means are integrated into a monolithic device, said accessing means comprises a first stage of the monolithic device including said memory and said logic means, and a second stage of the monolithic device; said monolithic device includes said one of said data buses connected between said first stage and said memory means to enable transmission of data between said processing means and said memory means via said first stage; and said monolithic device includes said others of data buses connected between said second stage and said memory means to enable transmission of data between said logic means and said memory means via said second stage.

* * * * *